United States Patent Office 3,012,004
Patented Dec. 5, 1961

---

3,012,004
BUTYL RUBBER STABILIZATION
Joseph W. Baker, Kirkwood, Mo., assignor to Monsanto Chemical Company, St. Louis, Mo., a corporation of Delaware
No Drawing. Filed Apr. 21, 1959, Ser. No. 807,759
8 Claims. (Cl. 260—45.7)

This invention relates to a process of stabilizing high molecular weight copolymers containing low controlled amounts of chemical unsaturation and particularly relates to stabilizing Butyl rubber.

Butyl rubber is a well recognized and commonly employed generic name applied to a variety of elastic copolymers of isobutylene and small quantities of diolefins. The diolefins are usually selected so to produce a final product which possesses only a small percentage of the unsaturation of natural rubber. The content of combined diolefin hydrocarbon is not greater than 15%. It has been reported that the minimum amount of a multiolefin which is significant and useful is about 0.2%. Due to its low unsaturation, Butyl rubber is very stable to oxidation but in the uncured state it depolymerizes during processing and storage. The results are a very tacky, soft product and serious loss of tensile strength in the cured polymers. Furthermore, the degradation may be so severe that it is no longer possible to cure to a solid material having a definite tensile strength. Some lapse of time between the manufacture and use is inevitable. Often the rubber must be stored for considerable lengths of time.

According to the present invention it has been found that the addition to Butyl rubber of a phosphorus sulfide increases the storage life of the polymers without discoloring them or other detrimental effect either to the raw polymer or to the cured product. The phosphorus sulfides may be represented by the structure

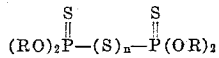

where R represents lower alkyl or lower alkoxyalkyl groups and $n$ is a whole number at least two but less than five.

The incorporation of the stabilizer to the rubber was carried out as follows: Unstabilized Butyl rubber was first blended on a 6 x 12 laboratory mill by passing it between the rolls ten times at a setting of .040±0.005 inch. The temperature of the roll surface was maintained between 30–40° C. during this operation. A 2.5% masterbatch was then prepared of each stabilizer under test. To 19.5 grams of the blended unstabilized rubber, which had been banded on a 3 x 7 mill (guide distance 6¼") at a mill setting of .020, was added 0.5 gram of stabilizer. After this addition, five ¾ cuts from alternate sides were made at 30 second intervals after which the stock was passed through the mill three times at the same mill setting as above. Each stabilized masterbatch was then added to a further quantity of blended unstabilized Butyl rubber to give the desired concentration in the rubber. For this final mixing of the test stocks, the blended unstabilized Butyl rubber was banded on a 3 x 7 mill at a setting of 0.068 with the surface maintained at 30–40° C. and the stabilized masterbatch added. Five ¾ cuts from alternate sides at 35 second intervals were made and the stock was then passed through the mill four times at a mill setting of .020.

To demonstrate the effectiveness of the phosphorus sulfides for stabilizing Butyl rubber, stocks were prepared as described above. In the final mixing step 46 grams of the blended unstabilized Butyl rubber and 4 grams of the stabilized masterbatch were employed to give a concentration of 0.2% of the stabilizer in the rubber. A 20 gram portion was used for the tests. Any air entrapped in the rubber during the mixing step was removed from each stock by pressing the sample between two 24 gauge aluminum sheets, 18 inches square, in a hydraulic press at a temperature of 250° F./800 p.s.i. The stock was pressed three times and allowed to flow for ten seconds each time and was folded back upon itself four times after each pressing. The stock was then formed into a thin, circular sheet by molding in a mold made by cutting a 6 inch diameter hole in a 22 gauge aluminum sheet 10 inches square. The mold and rubber stock were sandwiched between two 24 gauge aluminum sheets and were allowed to remain in the press, under pressure, for 2 minutes. The formed test sheet was then placed on a circular aluminum disc slightly smaller than the inside diameter of a one gallon can.

Each test sheet was sealed in a one gallon can and aged by placing the can in a forced draft oven at 150° C. for different periods of time. At the end of the aging period one-half inch strips were cut from the sheet and rolled into cylinders one-half in diameter and the cylinders were placed into the cavities of a ¾" I.D. mold ½" deep containing a ⅛" overflow ring, ¹⁄₁₆" deep. The mold containing the stock was placed between two 24 gauge aluminum sheets in a hydraulic press at 250° F. The mold was allowed to remain in the hot press for 5 minutes and then removed, sandwiched between two cold steel plates and cooled under cold running water. After stripping the aluminum sheet from the mold and removing the pellets, the pellets were allowed to remain for ½ hour at room temperature, then placed between two sheets of cellophane and compressed between the plates of a Williams plastometer at room temperature. At the end of exactly one minute the compression was read on the dial to the nearest thousandth of an inch. The Williams plastometer, which is in reality a plastometer press, is described by Williams, Industrial & Engineering Chemistry, vol. 16, page 362 (1924)—see also Krall, ibid., vol. 16, page 922 (1924). It has a movable upper weighted plate connected to a gauge graduated to ¹⁄₁₀₀₀ inch so that the distance between the upper and lower plates of the perss can be measured accurately.

In the table below are recorded results employing typical phosphorus sulfides as stabilizers at a concentration of 0.2%. The higher figures indicate the lesser degrees of depolymerization.

*Table I*

| Stabilizer | Height of .375" Pellet in Inches after aging at 150° C. | | |
|---|---|---|---|
| | 0 Hrs. | 4 Hrs. | 6 Hrs. |
| None | .226 | tacky | tacky |
| Phenyl-beta-naphthylamine | .218 | .186 | .185 |
| Bis(diethylthionophosphonato)-disulfide | .224 | .217 | .211 |
| Bis(diisopropylthionophosphonato)-tetrasulfide | .231 | .206 | .199 |
| Bis(dimethylthionophosphonato)-disulfide | .227 | .210 | .201 |
| Bis(dimethoxyethylthionophosphonato)disulfide | .224 | .226 | .213 |

These data show that the phosphorus sulfides of this invention are extremely effective for preventing degradation of Butyl rubber and inhibiting depolymerization on heating. While a concentration of 0.2% is very effective, useful results are obtained with even lower amounts. For example, employing bis(diethylthionophosphonato) trisulfide in the manner described at a concentration of 0.1% on the rubber, gave a figure of .152 after aging at 150° C. for 4 hours as compared to a figure of .162 for the commercial stabilizer phenyl-beta-naphthylamine. In general, 0.01%–5% by weight of the rubber comprise the proportions to be used. The expression "Butyl rubber"

designates a copolymer of 85 to about 99% by weight isoolefin of 4 to 7 carbon atoms and 15 to about 1% by weight of a conjugated multiolefin containing 4 to 10 carbon atoms. The preparation of the Butyl type rubbers is fully described in the literature. The preferred isoolefin is isobutylene and the preferred multiolefin is isoprene. Other suitable multiolefins include butadiene, dimethyl butadiene and piperylene.

It is intended to cover all changes and modifications of the examples of the invention herein chosen for purposes of disclosure which do not constitute departures from the spirit and scope of the invention.

What is claimed is:

1. The composition comprising unvulcanized copolymer composed of at least 85% isobutylene and a minor amount of a conjugated diene hydrocarbon the storage life of which has been enhanced by having incorporated therein a small amount, sufficient to inhibit depolymerization, of a phosphorus sulfide represented by the structure

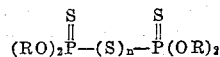

where R is selected from a group consisting of lower alkyl and alkoxy substituted lower alkyl and $n$ is an integer at least two but less than five.

2. The composition comprising unvulcanized copolymer composed of at least 85% isobutylene and a minor amount of a conjugated diene hydrocarbon the storage life of which has been enhanced by having incorporated therein a small amount, sufficient to inhibit depolymerization, of a phosphorus sulfide represented by the structure

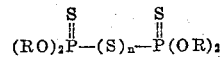

where R is a lower alkyl group and $n$ is an integer at least two but less than five.

3. The composition comprising unvulcanized copolymer composed of at least 85% isobutylene and a minor amount of a conjugated diene hydrocarbon the storage life of which has been enhanced by having incorporated therein a small amount, sufficient to inhibit depolymerization, of a phosphorus sulfide represented by the structure.

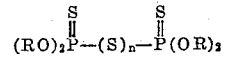

where R is an alkoxy substituted lower alkyl group and $n$ is an integer at least two but less than five.

4. The composition comprising unvulcanized copolymer composed of at least 85% isobutylene and a minor amount of a conjugated diene hydrocarbon the storage life of which has been enhanced by having incorporated therein a small amount, sufficient to inhibit depolymerization, of a phosphorus sulfide represented by the structure.

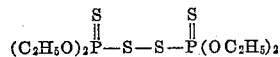

5. The composition comprising unvulcanized copolymer composed of at least 85% isobutylene and a minor amount of a conjugated diene hydrocarbon the storage life of which has been enhanced by having incorporated therein a small amount, sufficient to inhibit depolymerization, of a phosphorus sulfide represented by the structure.

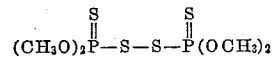

6. The composition comprising unvulcanized copolymer composed of at least 85% isobutylene and a minor amount of a conjugated diene hydrocarbon the storage life of which has been enhanced by having incorporated therein a small amount, sufficient to inhibit depolymerization, of a phosphorus sulfide represented by the structure.

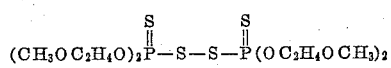

7. The composition comprising unvulcanized copolymer composed of at least 85% isobutylene and a minor amount of a conjugated diene hydrocarbon the storage life of which has been enhanced by having incorporated therein a small amount, sufficient to inhibit depolymerization, of a phosphorus sulfide represented by the structure.

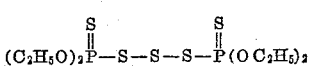

8. The composition comprising unvulcanized copolymer composed of at least 85% isobutylene and a minor amount of a conjugated diene hydrocarbon the storage life of which has been enhanced by having incorporated therein a small amount, sufficient to inhibit depolymerization, of a phosphorus sulfide represented by the structure

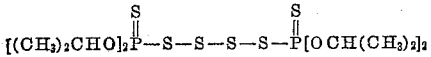

References Cited in the file of this patent

UNITED STATES PATENTS

| | | |
|---|---|---|
| Re. 20,411 | Romieux et al. | June 15, 1937 |
| 2,798,860 | Hand et al. | July 9, 1957 |
| 2,841,608 | Hechenbleikner et al. | July 1, 1958 |